United States Patent [19]
Dagnese

[11] Patent Number: 5,931,500
[45] Date of Patent: Aug. 3, 1999

[54] HYDRAULIC AUTOMOBILE JACK SYSTEM

[76] Inventor: Ralph R. Dagnese, 50 Roslyn St., Salem, Mass. 01970

[21] Appl. No.: 09/031,467

[22] Filed: Feb. 26, 1998

[51] Int. Cl.$^6$ .................................................... B60S 9/02
[52] U.S. Cl. .................................. 280/766.1; 280/763.1; 254/423
[58] Field of Search .......................... 280/766.1, 763.1, 280/764.1, 765.1; 254/423; 180/453.4

[56] References Cited

U.S. PATENT DOCUMENTS

| | | | |
|---|---|---|---|
| 4,191,270 | 3/1980 | Monteith | 180/53 |
| 4,863,184 | 9/1989 | Mena | 280/475 |
| 5,143,386 | 9/1992 | Uriarte | 280/6.1 |
| 5,224,688 | 7/1993 | Torres et al. | 254/423 |
| 5,312,119 | 5/1994 | Schneider et al. | 280/6.1 |
| 5,714,807 | 2/1998 | Albanes | 307/10.2 |
| 5,722,641 | 3/1998 | Martin et al. | 254/423 |

*Primary Examiner*—J J Swann
*Assistant Examiner*—David R. Dunn

[57] ABSTRACT

A vehicular hydraulic jack system is provided including a fluid reservoir mounted within the vehicle and a fluid pump connected to the fluid reservoir. The fluid pump is adapted to generate pressurized fluid upon the actuation thereof and further release pressurized fluid when deactuated. Four hydraulic jacks each include a cylinder adapted to extend downwardly upon receipt of pressurized fluid and further retract when the pressurized fluid is released therefrom. Also included is a transmission control mechanism including a sensor for generating a park signal only when a transmission of the vehicle is placed in a park mode. A hydraulic jack control panel functions to direct and release pressurized fluid to and from the hydraulic jacks via the fluid pump only upon the receipt of the park signal.

3 Claims, 2 Drawing Sheets

HYDRAULIC AUTOMOBILE JACK SYSTEM

BACKGROUND OF THE INVENTION

1. Field of the Invention

The present invention relates to vehicle jack systems and more particularly pertains to a new hydraulic automobile jack system for safely elevating selected tires of a vehicle.

2. Description of the Prior Art

The use of vehicle jack systems is known in the prior art. More specifically, vehicle jack systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle jack systems include U.S. Pat. No. 4,235,542; U.S. Pat. No. 5,219,429; U.S. Pat. No. Des. 348,966; U.S. Pat. No. 5,224,688; U.S. Pat. No. 5,011,119; and U.S. Pat. No. 4,993,688.

In these respects, the hydraulic automobile jack system according to the present invention substantially departs from the conventional concepts and designs of the prior art, and in so doing provides an apparatus primarily developed for the purpose of safely elevating selected tires of a vehicle.

SUMMARY OF THE INVENTION

In view of the foregoing disadvantages inherent in the known types of vehicle jack systems now present in the prior art, the present invention provides a new hydraulic automobile jack system construction wherein the same can be utilized for safely elevating selected tires of a vehicle.

The general purpose of the present invention, which will be described subsequently in greater detail, is to provide a new hydraulic automobile jack system apparatus and method which has many of the advantages of the vehicle jack systems mentioned heretofore and many novel features that result in a new hydraulic automobile jack system which is not anticipated, rendered obvious, suggested, or even implied by any of the prior art vehicle jack systems, either alone or in any combination thereof.

To attain this, the present invention generally comprises a fluid reservoir mounted within the vehicle. Also included is a fluid pump connected to the fluid reservoir and mounted to an engine of the vehicle. As shown in FIG. 1, the fluid pump has a pulley for being coupled to a fan pulley of the vehicle via a belt. In use, the fluid pump serves to generate pressurized fluid with mechanical energy received from the fan pulley of the vehicle upon the actuation thereof. The fluid pump is further adapted to release pressurized fluid when deactuated. Next provided are four hydraulic jacks each including a vertically oriented upper sleeve with a pair of mounting tabs extending laterally therefrom in tangential relationship therewith. Each mounting tab has a pair of apertures formed therein for being secured to a frame of the vehicle in front of a corresponding wheel of the vehicle. Each hydraulic jack further includes a cylinder having a top end slidably situated within the corresponding sleeve. In operation, the cylinders of the hydraulic jacks are adapted to extend downwardly upon receipt of pressurized fluid and further retract when the pressurized fluid is released therefrom. FIG. 5 shows a hydraulic jack position sensor assembly including an upper limit switch situated on each of the hydraulic jacks. Each switch of the hydraulic jack position sensor assembly serves for generating a retracted signal only when the cylinder of the associated hydraulic jack is in a retracted orientation. FIGS. 5 & 6 show a transmission control means including a sensor for generating a park signal only when a transmission of the vehicle is placed in a park mode. The transmission control means is adapted to prevent the transfer of the transmission from the park mode when in receipt of a safety signal. Connected between the fluid pump, position sensor assembly, transmission control means and the hydraulic jacks is a hydraulic jack control panel. As shown in FIG. 4, the control panel includes four three-position slider switches each adapted to actuate the fluid pump and direct pressurized fluid to an associated one of the hydraulic jacks only upon the placement of the slider switch in an up position. Further, each slider switch functions to release fluid from an associated one of the hydraulic jacks only upon the placement of the slider switch in a down position. When placed in a neutral position, each slider switch maintains the corresponding hydraulic jack in a present orientation. It is imperative that the control panel direct and release pressurized fluid to and from the hydraulic jacks only upon the receipt of the park signal. Furthermore, the control panel must be further adapted to transmit the safety signal to the transmission control means during the lack of receipt of the retracted signal from any one of the switches of the hydraulic jack position assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hydraulic automobile jack system apparatus and method which has many of the advantages of the vehicle jack systems mentioned heretofore and many novel features that result in a new hydraulic automobile jack system which is not anticipated, rendered obvious, suggested, or even implied by any of the prior art vehicle jack systems, either alone or in any combination thereof.

It is another object of the present invention to provide a new hydraulic automobile jack system which may be easily and efficiently manufactured and marketed.

It is a further object of the present invention to provide a new hydraulic automobile jack system which is of a durable and reliable construction.

An even further object of the present invention is to provide a new hydraulic automobile jack system which is susceptible of a low cost of manufacture with regard to both materials and labor, and which accordingly is then susceptible of low prices of sale to the consuming public, thereby making such hydraulic automobile jack system economically available to the buying public.

Still yet another object of the present invention is to provide a new hydraulic automobile jack system which provides in the apparatuses and methods of the prior art some of the advantages thereof, while simultaneously overcoming some of the disadvantages normally associated therewith.

Still another object of the present invention is to provide a new hydraulic automobile jack system for safely elevating selected tires of a vehicle.

Even still another object of the present invention is to provide a new hydraulic automobile jack system that includes a fluid reservoir mounted within the vehicle and a fluid pump connected to the fluid reservoir. The fluid pump is adapted to generate pressurized fluid upon the actuation thereof and further release pressurized fluid when deactuated. Four hydraulic jacks each include a cylinder adapted to extend downwardly upon receipt of pressurized fluid and further retract when the pressurized fluid is released therefrom. Also included is a transmission control mechanism including a sensor for generating a park signal only when a transmission of the vehicle is placed in a park mode. A hydraulic jack control panel functions to direct and release pressurized fluid to and from the hydraulic jacks via the fluid pump only upon the receipt of the park signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
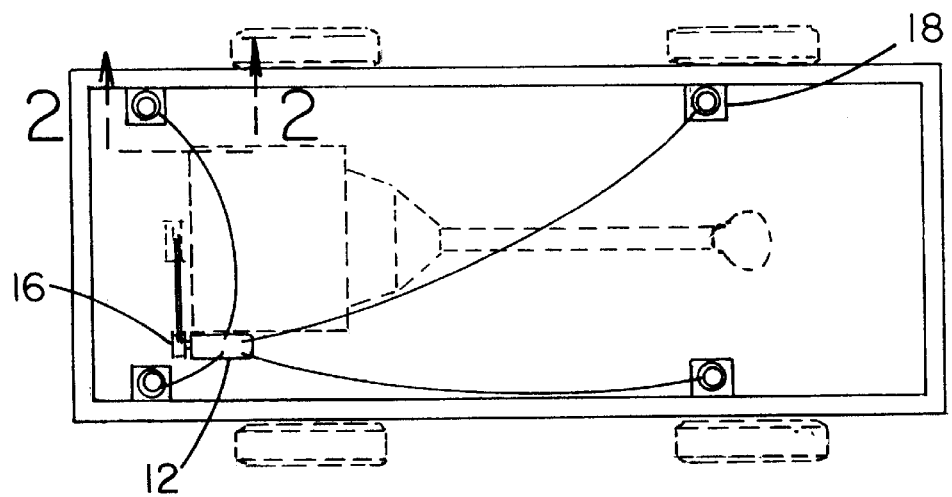
FIG. 1 is a top plan view of a new hydraulic automobile jack system according to the present invention.
Figures 2, 3:
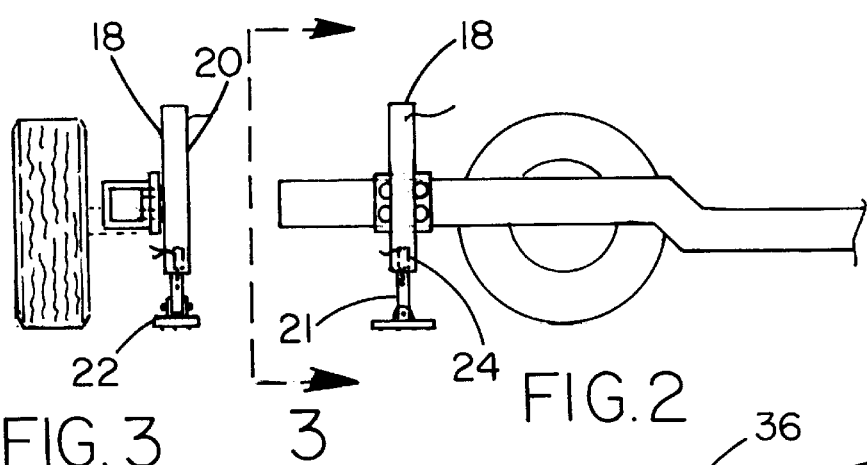
FIG. 2 is a side view of one of the hydraulic jacks of the present invention.
FIG. 3 is a front view of the hydraulic jack of FIG. 2.

With reference now to the drawings, and in particular to FIGS. 1 through 7 thereof, a new hydraulic automobile jack system embodying the principles and concepts of the present invention and generally designated by the reference numeral 10 will be described.

The present invention, designated as numeral 10, includes a fluid reservoir mounted within the vehicle. Also included is a fluid pump 12 connected to the fluid reservoir and mounted to an engine of the vehicle. As shown in FIG. 1, the fluid pump has a pulley 16 for being coupled to a fan pulley of the vehicle via a belt. In use, the fluid pump serves to generate pressurized fluid with mechanical energy received from the fan pulley of the vehicle upon the actuation thereof. The fluid pump is further adapted to release pressurized fluid when deactuated.

Figure 7:
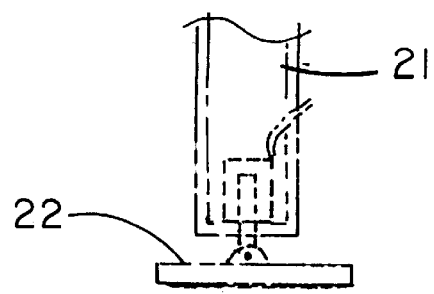
FIG. 7 is an illustration of a bottom of a cylinder of one of the hydraulic jacks of the present invention.

Next provided are four hydraulic jacks 18 each including a vertically oriented upper sleeve 20 with a pair of mounting tabs extending laterally therefrom in tangential relationship therewith. Each mounting tab has a pair of apertures formed therein for being secured to a frame of the vehicle in front of a corresponding wheel of the vehicle. Each hydraulic jack further includes a cylinder 21 having a top end slidably situated within the corresponding sleeve. As shown in FIG. 7, each cylinder is equipped with a foot plate 22 pivotally coupled about a horizontal axis to a bottom end thereof. A bottom surface of the foot plate is roughened. In operation, the cylinders of the hydraulic jacks are adapted to extend downwardly upon receipt of pressurized fluid and further retract when the pressurized fluid is released therefrom.

Figure 5:
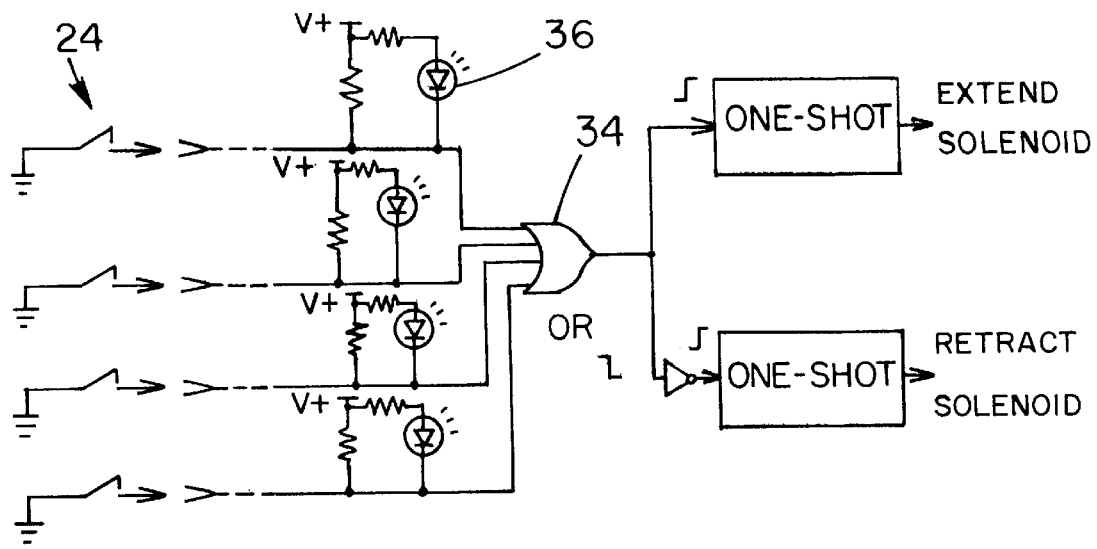
FIG. 5 is a schematic diagram of the circuitry associated with the present invention.

FIG. 5 shows a hydraulic jack position sensor assembly 24 including an upper limit switch situated on each of the hydraulic jacks. Each switch of the hydraulic jack position sensor assembly serves for generating a retracted signal only when the cylinder of the associated hydraulic jack is in a retracted orientation.

Figure 6:
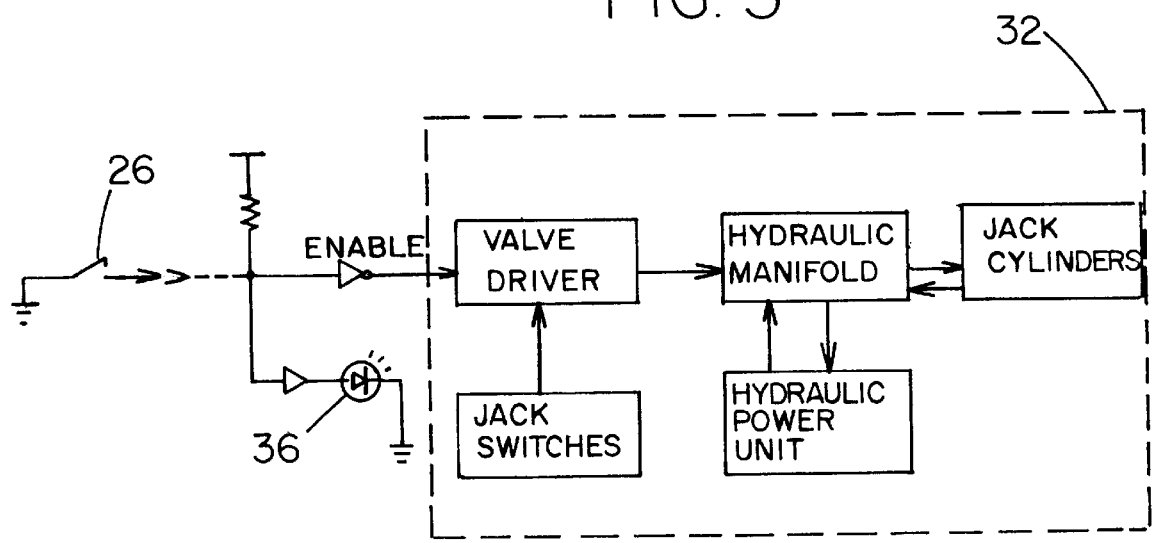
FIG. 6 is another schematic diagram of circuitry of the present invention.

FIGS. 5 & 6 show a transmission control means including a sensor 26 for generating a park signal only when a transmission of the vehicle is placed in a park mode. The transmission control means is adapted to prevent the transfer of the transmission from the park mode when in receipt of a safety signal. This may be accomplish via a locking solenoid or the like which is adapted to preclude the movement of a shift arm of the vehicle.

Figure 4:
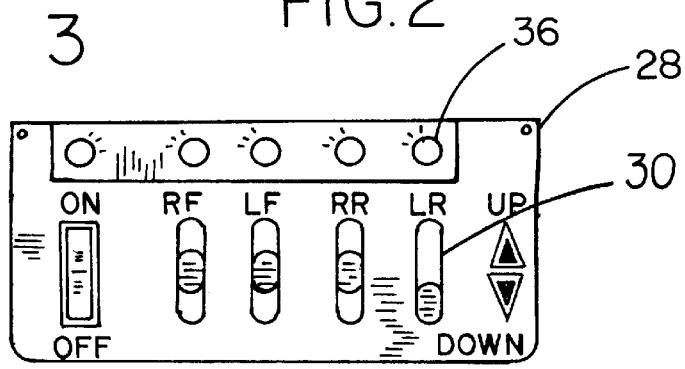
FIG. 4 is a front view of the control panel of the present invention.

Connected between the fluid pump, hydraulic jack position sensor assembly, transmission control means and hydraulic jacks is a hydraulic jack control panel 28. As shown in FIG. 4, the control panel includes four three-position slider switches 30 each adapted to actuate the fluid pump and direct pressurized fluid to an associated one of the hydraulic jacks only upon the placement of the slider switch in an up position. Further, each slider switch functions to release fluid from an associated one of the hydraulic jacks only upon the placement of the slider switch in a down position. When placed in a neutral position, each slider switch maintains the corresponding hydraulic jack in a present orientation. It should be noted that the means 32 by which the slider switches work in conjunction with the fluid pump to control the position of the hydraulic jacks is commonly known, as exemplified U.S. Pat. No. 5,219,429 which is incorporated herein by reference.

It is imperative that the control panel direct and release pressurized fluid to and from the hydraulic jacks only upon the receipt of the park signal. As shown in FIG. 6, this is accomplished by utilizing the grounded park signal as an enable signal which is passed through an inverter. As such, the present invention may begin operation only when the vehicle is in a park mode.

Furthermore, the control panel must be further adapted to transmit the safety signal to the transmission control means during the lack of receipt of the retracted signal from any one of the switches of the hydraulic jack position assembly. FIG. 5 shows that this is accomplished by an OR gate 34 which passes a signal that is directed to a pair of one shot multivibrators one of which having an inverter preceding it. By this structure, the aforementioned solenoid associated with the transmission control means is extended when any one of the hydraulic jacks is extended and retracted when all of the hydraulic jacks are retracted. As such, the vehicle may not be used until the hydraulic jacks are raised.

Mounted on the control panel is a plurality of light emitting diodes. Such light emitting diodes include four green light emitting diodes 36 each situated above an associated one of the slider switches. The green light emitting diodes illuminate only upon the receipt of the retracted signal from the corresponding switch of the hydraulic jack position assembly. This is accomplished by the upper limit switches of the hydraulic jack position sensor assembly providing a ground through which current can flow.

A red light emitting diode 36 is adapted to illuminate only upon the actuation of the present invention via a power switch and the lack of receipt of the park signal. The switch of the transmission control means illuminates the red light emitting diode in a manner similar to that in which the green light emitting diodes are illuminated. As an option, the red light emitting diode may be actuated via the switch 38 shown in FIG. 7 which is depressed when the cylinder of the hydraulic jack is lowered.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular hydraulic jack system comprising, in combination:

a fluid reservoir mounted within a vehicle;

a fluid pump connected to the fluid reservoir and mounted to an engine of the vehicle and having a pulley for being coupled to a fan pulley of the vehicle via a belt, the fluid pump adapted to generate pressurized fluid with mechanical energy received from the fan pulley of the vehicle upon the actuation thereof and further release pressurized fluid when deactuated;

four hydraulic jacks each including a vertically oriented upper sleeve with a pair of mounting tabs extending laterally therefrom in tangential relationship therewith, each mounting tab having a pair of apertures formed therein for being secured to a frame of the vehicle in front of a corresponding wheel of the vehicle, each hydraulic jack further comprising a cylinder having a top end slidably situated within the corresponding sleeve and a bottom end having a foot plate with a roughened bottom surface pivotally coupled thereto about a horizontal axis, wherein the cylinders of the hydraulic jacks are adapted to extend downwardly upon receipt of pressurized fluid and further retract when the pressurized fluid is released therefrom;

a hydraulic jack position sensor assembly including an upper limit switch situated on each of the hydraulic jacks for generating a retracted signal only when the cylinder of the associated hydraulic jack is in a retracted orientation;

a transmission control means including a sensor for generating a park signal only when a transmission of the vehicle is placed in a park mode and further adapted to prevent the transfer of the transmission from the park mode when in receipt of a safety signal via a locking solenoid which is adapted to preclude movement of a shift arm of the vehicle;

a hydraulic jack control panel connected between the fluid pump, position sensor assembly, transmission control means and the hydraulic jacks, the control panel including four three-position slider switches each adapted to actuate the fluid pump and direct pressurized fluid to an associated one of the hydraulic jacks only upon the placement of the slider switch in an up position, each slider switch further adapted to release fluid from an associated one of the hydraulic jacks only upon the placement of the slider switch in a down position and further adapted to maintain the corresponding hydraulic jack in a present orientation when placed in a neutral position;

said control panel adapted to direct and release pressurized fluid to and from the hydraulic jacks only upon a receipt of the park signal and further adapted to transmit the safety signal to the transmission control means during the lack of receipt of the retracted signal from any one of the switches of the hydraulic jack position sensor assembly; and a plurality of light emitting diodes mounted on the control panel and including four light emitting diodes of a first color each situated above an associated one of the slider switches for illuminating only upon a receipt of the retracted signal from the corresponding switch of the hydraulic jack position sensor assembly and a light emitting diode of a second color adapted to illuminate only upon the lack of receipt of the park signal.

2. A vehicular hydraulic jack system as set forth in claim 1 wherein the light emitting diode of the second color is further adapted to illuminate upon the depression of a switch positioned at the bottom end of the cylinder of each hydraulic jack and connected to the associated foot plate.

3. A vehicular hydraulic jack system as set forth in claim 1 wherein an OR gate, a pair of one-shot multivibrators, and an inverter are connected between the hydraulic jack position sensor assembly and the locking solenoid.

* * * * *